April 29, 1941.　　　　E. W. MURPHY　　　　2,240,049

WATER GATE

Filed Oct. 10, 1939　　　　2 Sheets-Sheet 1

INVENTOR
EDWIN W. MURPHY
BY
*Malcolm F. Bannen*
ATTORNEY

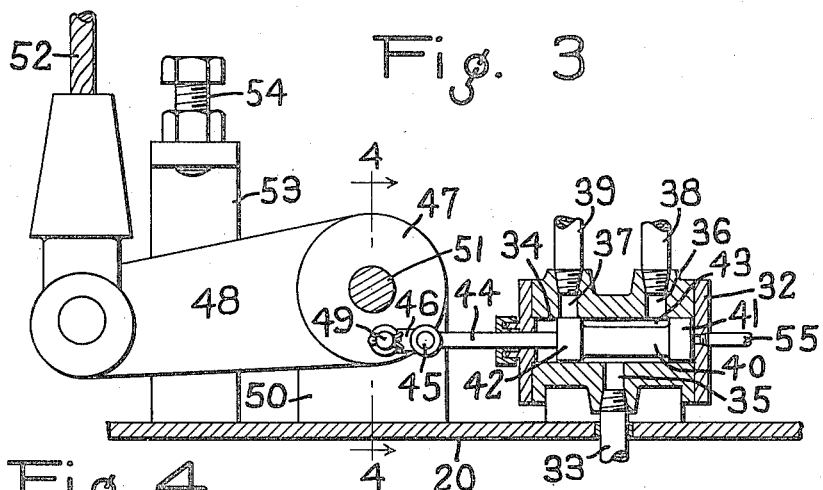
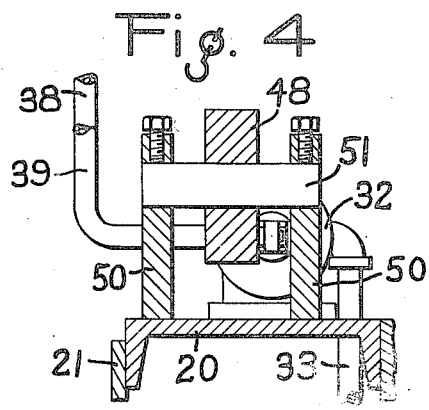
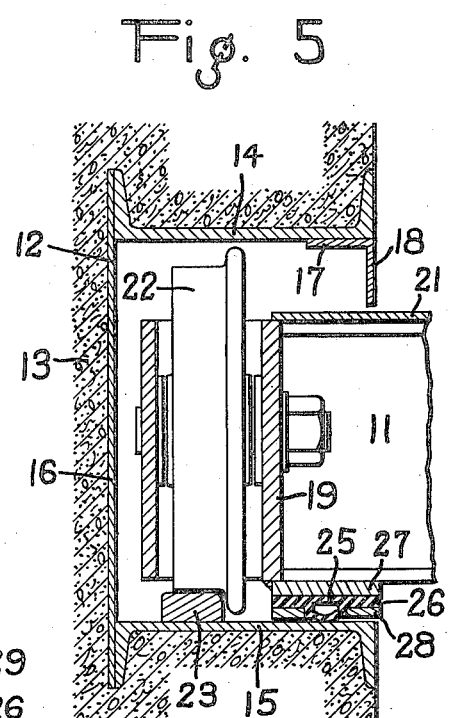
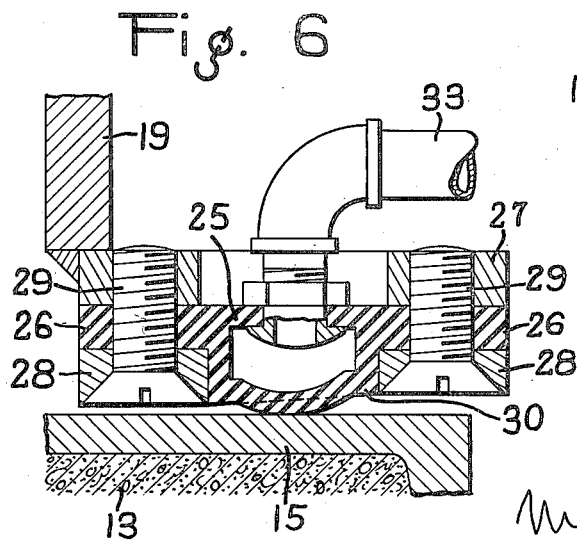

Patented Apr. 29, 1941

2,240,049

UNITED STATES PATENT OFFICE 2,240,049

WATER GATE

Edwin W. Murphy, York, Pa., assignor to S. Morgan Smith Company, York, Pa., a corporation of Pennsylvania Application October 10, 1939, Serial No. 298,735

6 Claims. (Cl. 61—28)

This invention relates to hydraulic gates, such as head gates, sluice gates, water gates, etc.

An object of the invention is to provide an improved sluice gate in which friction is reduced to a minimum.

Another object of the invention is to provide an improved sluice gate in which the gate is equipped with an inflatable seal.

Another object of the invention is to provide improved means for inflating the seal only when the gate is in closed position.

Other objects of the invention will be more fully described in connection with the accompanying drawings and will be more particularly pointed out in and by the appended claims.

In the accompanying drawings:

Fig. 3 is an enlarged view, partly in section, of a portion of the gate hoisting mechanism and the means associated therewith for controlling the inflation and deflation of the gate sealing means;

Fig. 4 is a vertical section taken on the line 4—4 of Fig. 3;

Fig. 5 is a horizontal section taken on the line 5—5 of Fig. 2; and

Fig. 6 is an enlarged cross section of the gate sealing means.

Figure 1:
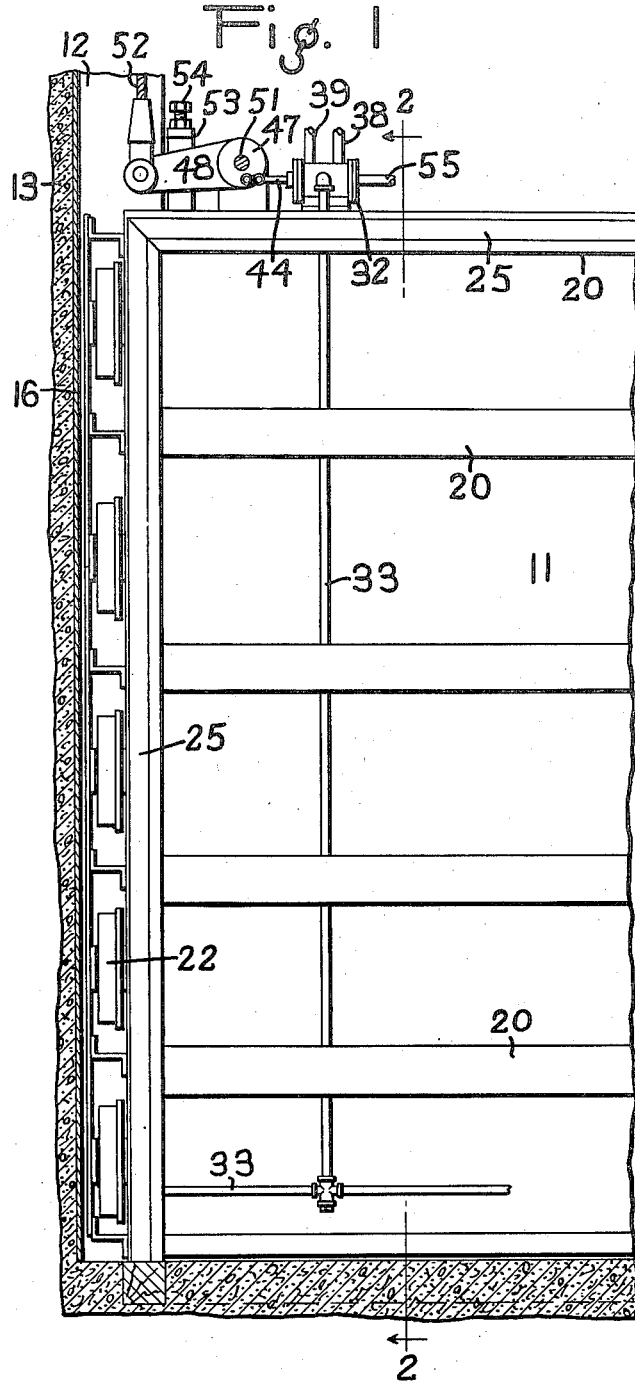
Figure 1 is a face view of the improved sluice gate in closed position.

Referring to the drawings, a sluice gate 11 of the type herein contemplated may be vertically slidable within a channeled guideway or frame 12 constructed in a wall or abutment 13.

The frame 12 may be constructed of structural steel members, as shown best in Fig. 5, and has an upstream wall 14, a downstream wall 15 opposed to the wall 14, and an inner wall 16 which is perpendicular to the walls 14 and 15.

Fixed to the wall 14 is an angle bar 17, arranged to provide a flange 18 which extends downstream towards the upstream face of the gate so as to partly close the gap between the gate and the frame and thereby prevent large pieces of debris and other foreign matter in the water from entering the channeled portion of the frame.

The gate 11 is preferably constructed of side bars 19 connected at their tops and bottoms and intermediately by cross beams 20 having suitable sectional form. A plate 21 covers the upstream side of the gate so as to prevent the passage of water therethrough.

Rotatably supported by the side bars 19 is a series of wheels 22 located at each vertical side of the gate.

The wheels 22 are adapted to engage a rail 23 mounted on the wall 15 of the frame 12.

In order to prevent leakage of water downstream when the gate 11 is in closed position, the bottom of the gate is adapted to rest upon a sill 24, preferably formed from timbers embedded in the abutment 13, and the downstream periphery of the gate has a sealing means, generally indicated at 25, said sealing means being arranged around the vertical sides and top of the gate on the downstream side thereof.

The sealing means 25 comprises a tube, preferably formed from rubber or other resilient material and generally rectangular in cross section.

The main body of the tube 25 is formed along its opposite sides with flanges 26, said flanges being coextensive with the tube.

The purpose of the flanges 26 is to enable the tube to be secured firmly to the gate, and consequently the portion of the gate on which the tube 25 is mounted, is formed with a plate 27. The flanges 26 are clamped between the plate 27 and strips 28, arranged in the manner shown best in Fig. 6, by screws 29.

The face of the tube 25 which engages the wall 15 is tapered, as indicated at 30. The tube is constructed in this manner so that when the seal is deflated a V-shaped gap is provided between the seal and the wall 15 to permit the water from the pool on the upstream side of the gate to pass downstream. Due to the construction of the seal, the water flowing past the seal builds up velocity and loses its pressure. The pressure on the seal being in this way reduced, it is not necessary to apply as great a pressure inside of the seal as would otherwise be required to inflate the seal against full head pressure. In other words, by the present design of seal it is possible to inflate the seal and completely seat the gate by admitting upstream water pressure to the inside of the seal.

Any suitable means may be utilized for controlling the inflation and deflation of the seal 25. In the present instance the seal is shown connected to a control valve device 32, by a pipe 33.

The control valve device 32 comprises a cylinder 34 provided with spaced ports 35, 36 and 37, the port 35 being arranged between the ports 36 and 37 and being connected to the pipe 33, as shown in Fig. 3.

The port 36 is connected to a source of supply of fluid by a pipe 38, and the port 37 is connected to the atmosphere or free discharge by a pipe 39.

A piston valve 40 is arranged in the cylinder 34, said piston valve having piston portions 41 and 42 so spaced that when the valve is in one position the piston portion 42 laps the port 37, and the port 36 is unlapped by the piston portion 41, so that fluid from the source of supply pipe 38 is delivered to the pipe 33 through port 36, chamber 43 and port 35, and when the piston valve 40 is in another position the fluid supply port 36 is lapped by the piston portion 41 and the tube 25 is connected to the atmosphere or free discharge, by pipe 33, port 35, chamber 43, port 37, and the pipe 39.

The piston valve 40 has a rod 44 which extends outwardly through an end wall of the cylinder 34 and is connected at its free end by a pin 45 to one end of a link 46.

The other end of the link 46 is connected to the hub 47 of an arm or crank 48, by a pin 49, said pin being disposed eccentrically with respect to the axis of rotation of the crank 48, for a purpose to be hereinafter more fully described.

The hub 47 of the crank 48 is connected to a bracket 50 mounted on the top of the gate 11, by a pin 51, the construction being such that the crank or arm 48 is mounted for vertical swinging movement on top of the gate.

Connected to the outer or free end of the crank or arm 48, is one end of the usual hoisting cable 52 provided for lowering and raising the gate, it being understood that while only one cable is shown in the present instance, as many cables may be employed as necessary, in order to operate the gate in well known manner by the usual hoisting mechanism, not shown.

Figure 2:
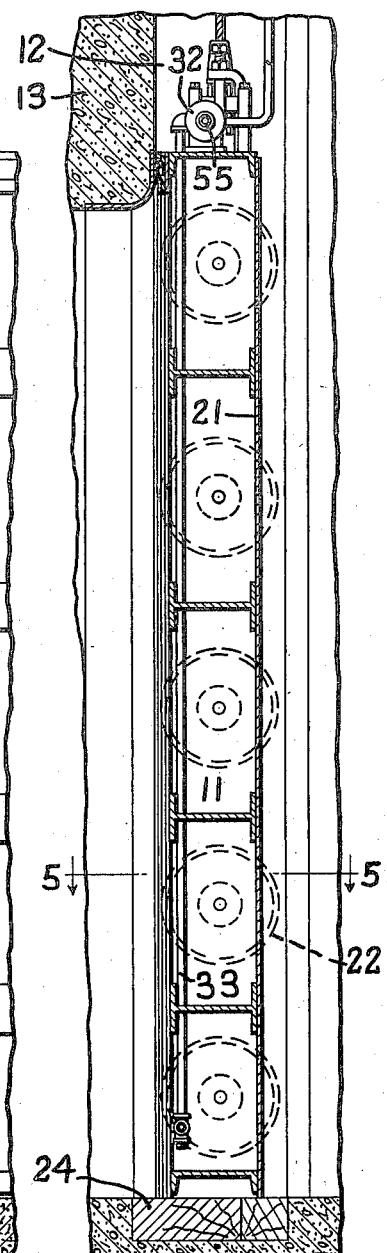
Fig. 2 is a vertical section taken on the line 2—2 of Fig. 1.

In order to limit the amount of vertical swinging movement imparted to the arm 48 when the cable 52 is pulled upwardly by the hoisting mechanism, a stop 53 is provided. This stop may comprise a bracket mounted on top of the gate 11 and having an upper portion overlying the arm 48 and carrying a set screw 54 adapted to engage the upper surface of the arm 48 when said arm is swung upwardly about the pivot provided by the pin 51 (see Figs. 1, 2 and 3).

When the gate 11 is in raised position the arm 48 will be in upper position in engagement with the stop 53. In this position of the arm 48, the pin 49 will be in a position to the left of the position shown in Fig. 3, and consequently the piston valve 40 will be moved to the left-hand position in the cylinder 34 in which port 37 is uncovered by the piston 42 and the piston 41 laps the port 36. Since the source of supply of fluid to the seal 25 is cut off in this position of the control valve 32, the seal will be deflated and the tapered sealing surface thereof will be in the position shown by the broken line, Fig. 6. In this way ample clearance is provided between the gate 11 and the channeled frame 12 to permit easy travel of the gate in said frame.

When the gate is lowered, the control valve device 32 will remain in the position in which the supply of fluid to the seal 25 is cut off until the bottom of the gate rests upon the sill 24, and the cable 52 is slackened, whereupon the control valve will be operated and the piston valve 40 will be moved to the position shown in Fig. 3. Fluid will then be supplied to the seal 25 and the latter will be inflated, as shown best in Fig. 6.

In order that the piston valve 40 can move freely within the cylinder 34, the end of the cylinder in which the piston 41 is disposed may be connected to a free discharge or the atmosphere by a pipe 55, as shown in Fig. 3.

While the pipe 38 is not shown connected to any source of supply of fluid, it will be appreciated that said pipe can be connected by a hose or the like to the pool on the upstream side of the gate, or the pipe may be connected with auxiliary air or liquid pressure from an independent source.

Furthermore, while the seal is shown as being mounted on the gate, if so desired said seal can be mounted on the frame 12 and the control valve 32 actuated by means operatively associated with the gate and operated by the gate in the manner above described.

Also, while in the present instance the seal is shown applied to a sluice gate, it will be understood that the same can be installed on other types of hydraulic gates, roller dams, and the like without departing from the spirit of the invention.

Having thus described my invention, what I claim is:

1. A hydraulic structure comprising a frame having a sill, a gate movable with respect to said frame and having a hoisting cable by means of which the gate is moved towards and away from said sill, an expansible sealing means for sealing the joint between said frame and said gate, a control means mounted on said gate for controlling the supply of fluid under pressure to said sealing means, and means operatively connecting said control means with said hoisting cable and operable when the gate engages said sill for operating said control means to effect inflation of said sealing means.

2. A hydraulic structure comprising a frame having a sill, a gate movable with respect to said frame and having a hoisting cable by means of which the gate is moved towards and away from said sill, an expansible sealing means for sealing the joint between said frame and said gate, a control means for controlling the supply of fluid under pressure to said sealing means, and means operatively connecting said control means with said hoisting cable and operable when said gate engages the sill and the hoisting cable becomes slack for operating said control means to effect inflation of said sealing means, said control operating means being operative when the hoisting cable is initially operated to move the gate away from the sill to effect deflation of the sealing means.

3. A hydraulic structure comprising a frame having a sill, a gate movable with respect to said frame and having a hoisting cable by means of which the gate is moved towards and away from the sill, an expansible sealing means mounted on said gate for sealing the joint between said frame and said gate, a control means mounted on said gate for controlling the supply of fluid under pressure to said sealing means, and means operatively connecting said control means with said hoisting cable for automatically operating said control means to effect inflation of the sealing means when the hoisting cable is slack and deflation of the sealing means when the hoisting cable is taut.

4. A hydraulic structure comprising a frame having a sill, a gate movable with respect to said frame and having a hoisting cable by means of which the gate is moved towards and away from said sill, an expansible tube carried by the gate for sealing the joint between said frame and said gate, a control means mounted on the gate for controlling the supply of fluid under pressure to said tube, and means operatively connecting said control means with said hoisting cable and operable when said cable is slack for effecting inflation of the tube, said control means being operable immediately upon all slackness being taken up in said cable to effect deflation of the tube at the initiation of the gate hoisting operation.

5. For controlling the flow of fluid through a conduit, a stationary member, a movable member adapted to be moved into and out of position with respect to said stationary member, means for operating said movable member, an expansible sealing means interposed in the space between said members and carried by one of said members and having an inclined surface adapted to abut the other member when said sealing means is inflated, a control means for controlling the supply of fluid under pressure to said sealing means, and means operatively connecting said control means with said operating means to effect inflation of said sealing means when said movable member is moved into position with said stationary member and to effect deflation of said sealing means at the initiation of the operation of said operating means to move the movable member out of position with said stationary member.

6. A hydraulic structure comprising a frame having a sill, a gate movable with respect to said frame and having a bottom adapted to rest on said sill, an expansible sealing means interposed between said frame and said gate, and means for inflating and deflating said sealing means including a control valve device having a series of ports connected, respectively, to said sealing means, a source of fluid under pressure, and to the atmosphere, a piston valve adapted to control communication through said ports, a hoisting cable for said gate, and means connecting said hoisting cable with said piston valve, whereby when the gate is lowered to the position in which the bottom of the gate rests on the sill and said cable is slackened the piston valve is positioned so that fluid under pressure is supplied to said sealing means and the latter is inflated, and when the hoisting cable is made taut the piston valve is shifted to the position in which the supply of fluid under pressure is cut-off and the fluid pressure within the sealing means is vented to the atmosphere.

EDWIN W. MURPHY.